United States Patent [19]

Tomcufcik et al.

[11] 3,725,407
[45] Apr. 3, 1973

[54] 6-SUBSTITUTED AMINO-3-NITROIMIDAZO(1,2-B)PYRIDAZINES AND METHODS OF PREPARING THE SAME

[75] Inventors: Andrew Stephen Tomcufcik, Old Tappan, N.J.; Patrick Thomas Izzo; Paul Frank Fabio, both of Pearl River, N.Y.

[73] Assignee: American Cyanamid Company, Stamford, Conn.

[22] Filed: Apr. 8, 1971

[21] Appl. No.: 132,565

[52] U.S. Cl. ................................ 260/250 A, 424/250
[51] Int. Cl. .............................................. C07d 51/04
[58] Field of Search ................................ 260/250 A

[56] References Cited

UNITED STATES PATENTS

| | | | |
|---|---|---|---|
| 3,494,921 | 2/1970 | Dorman | 260/250 R |
| 3,562,271 | 2/1971 | Doebel et al. | 260/250 R |
| 3,575,976 | 4/1971 | Doebel et al. | 260/250 R |

Primary Examiner—Nicholas S. Rizzo
Attorney—Ernest Y. Miller

[57] ABSTRACT

The preparation of 6-substituted amino-3-nitroimidazo-[1,2-b]pyridazines by reacting a 6-amino or substituted amino-3-nitroimidazo[1,2-b]pyridazine with an acid chloride or acid anhydride, is described. Other methods of preparing 6-substituted amino-3-nitroimidazo[1,2-b]pyridazines are described. The compounds are useful for their antiprotozoal and particularly antitrichomonal and antiamebic activity in warm-blooded animals.

6 Claims, No Drawings

6-SUBSTITUTED AMINO-3-NITROIMIDAZO(1,2-B)PYRIDAZINES AND METHODS OF PREPARING THE SAME

This invention relates to 6-substituted amino-3-nitroimidazo[1,2-b]pyridazines and method of preparation thereof.

The compounds of this invention may be illustrated by the following formula:

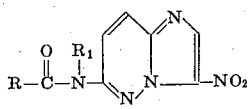

wherein R is alkyl ($C_1$ to $C_{11}$) and $R_1$ is selected from the group consisting of hydrogen and lower alkyl.

The present compounds are, in general, crystalline solids with melting points generally above one hundred fifty degrees. They are relatively insoluble in water, but somewhat soluble in organic solvents such as pyridine, dimethylformamide, etc.

In the above formula, the term lower alkyl is intended to include those having one to four carbon atoms.

The compounds of the present invention may be prepared by either of the following procedures:

A.

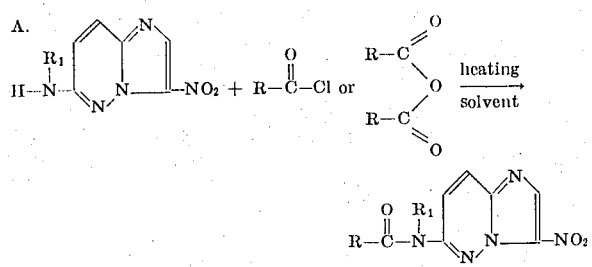

wherein R is alkyl ($C_1$-$C_{11}$) and $R_1$ is as hereinbefore described.

B.

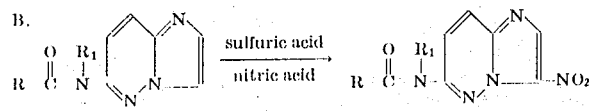

wherein R and $R_1$ are as described above.

The present compounds are useful for their antiprotozoal and particularly antitrichomonal and antiamebic activity in warm-blooded animals.

Compositions containing the 6-substituted amino-3-nitro-imidazo[1,2-b]pyridazines may be administered to warm-blooded animals orally, or parenterally if desired, and when so administered, may be considered as an agent for therapeutically desirable treatment of particularly amebic or trichomonal infections in daily doses ranging from about 1.0 mg. to about 30 mg. per kilogram of warm-blooded animal. The dosage regimen can be adjusted to provide optimum therapeutic response. Thus, for example, several smaller doses may be administered daily, or the dose may be increased or reduced proportionately as indicated by the requirements of the particular therapeutic situation.

For therapeutic administration the active compounds of this invention may be incorporated with pharmaceutically acceptable carriers such as excipients and used, for example, in pharmaceutical dispensing forms such as tablets, dragees, capsules, suppositories, liquids, elixirs, emulsions, suspensions or the like. Such compositions and preparations preferably should contain at least 2 percent active component. The percentage in the compositions and pharmaceutical preparations, may of course, be varied, and may conveniently be between 2 percent and 60 percent or more of the weight of the unit. The amount of compound in such therapeutically useful compositions or preparations is such that a suitable dosage will be obtained. Preferred compositions or preparations according to the present invention are prepared so that a dosage unit form contains between about 10 and about 300 milligrams of the active compound. Obviously, in addition to the therapeutic compound, there may be present excipients, binders, fillers and other therapeutically inert ingredients necessary in the formulation of the desired pharmaceutical preparation.

The amebicidal properties of the present compounds are measured by means of an assay devised from W. R. Jones, "The Experimental Infection of Rats with *Entamoeba Histolytica* and a method for evaluating the Antiamebic properties of New Compounds," *Annals of Tropical Medicine and Parasitology*, Volume 40, pages 130–140 (1946). The assay is carried out as follows.

The test organism is *Entamoeba histolytica* NIH 200μ. Cultures are maintained on Cleveland Collier liver infusion medium with serum saline 1:1 overlay in 3 × 5 test tube slants. Rice powder is added as a growth factor. Cultures are transferred at 5 day intervals and kept at 37°C. A 48 hour culture is used for the test inoculum and harvested the morning of the test by collecting the sediment containing rice powder and amoebae found at the junction of the butt and the slant. The amoebae are counted and the amount of inoculum for injection is adjusted to contain approximately 200,000 to 250,000 amoebae. Female Wistar strain albino rats from the Royalhart Farms weighing 20–35 grams are used. The cecum is exposed during laporatomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard laboratory feed sold under the trademark Purina Lab. Chow by the Ralston Purina Co. Rats are maintained on the drug diet for 5 days at the end of which they are necropsied and the cecum examined both macroscopically for pathologic feature of infection and microscopically for the presence of amoebae. Scores of one each are recorded for evidences of mucous, fibrosis, and lesions or inflammation. A score of one is recorded for a finding of 1–20 amoeba and a score of 2 for a finding of more than 20 amoeba on a standard slide preparation. Total score of 0–5 (Average Degree of Infection or A.D.I.) thus, is possible per rat at necropsy. The arithmetic mean of the combined A.D.I.'s in a test or control group of rats is considered to be the group A.D.I. Activities are expressed in percentage of suppression of group A.D.I. of a test group to the group A.D.I. of a control group. Consumption of test compound is determined from the weight of feed consumed. The following Table I shows the amebicidal activity of representative compounds of the present invention.

TABLE I

The action of nitroimidazopyridazines against experimental intestinal amebiasis in rats All compounds are tested initially to 0.025 percent drug concentration in the diet (approximately 30 mg./kg./day × 5)

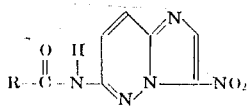

| Compound R | Minimum effective dose (60% supp. of control (A.D.I.) mg./kg./day×5 (diet)) |
|---|---|
| —CH₃ | 15 |
| —C₂H₅ | 30 |
| —C₁₀H₂₁ | 30 |

NOTE: A.D.I.=Average Degree of Infection.

The present compounds have shown activity as trichomonicides in tests designed to detect this activity. One such test is carried out as follows.

Female albino mice (Royalhart ICR strain) are inoculated subcutaneously with 50,000 to 100,000 *Trichomonas vaginalis* (Thoms strain) suspended in a cysteine-peptone-liver infusion-maltose medium described by Garth Johnson and Ray E. Trussell, "Experimental Basis for the Chemotherapy of Trichomonas vaginalis Infections I.", *Proceedings of the Society for Experimental Biology and Medicine* Volume 54, pages 245–249 (1943). In control animals, approximately 1 week postinoculation, the site of inoculation is marked by a subcutaneous abcess which contains numerous trichomonads in a menstruum of pus. In effectively treated animals the abcesses are either undetectable or greatly reduced in size, and motile trichomonads cannot be detected in the lesion-derived material after prolonged microscopic examination. Presence of a single motile trichomonad after treatment is recorded as a negative result.

Treatment by test drugs consists either of one or more oral doses suspended in 0.2 percent agar and administered by gavage 1 day post inoculation, or by administration in the diet for 5 consecutive days beginning 1 day postinoculation. The diet is a commercial laboratory feed sold under the trademark Purina Lab. Chow by the Ralston-Purina Co. The test compound is mixed thoroughly in the carrier; 0.2 percent agar, 0.5 percent carboxymethylcellulose or ground laboratory feed. Each regimen is administered to a test group consisting of five or 10 mice. Control groups of five or 10 mice receive the carrier alone. Gavage doses are estimated for the average mouse weight obtained just before dosing. Drug intakes resulting from diet therapy are estimated from average mouse weights and total group feed intakes during the treatment period. Activities of many compounds of this invention in this test are comparable to that of 2-methyl-5-nitro-1-imidazolethanol, a well known trichomonicide. The following Table II shows the activity against *Trichomonas vaginalis* of representative compounds of the present invention.

SPECIFIC DISCLOSURE

The following examples describe in detail the preparation of representative compounds of this invention and their use in pharmaceutical formulations.

TABLE II

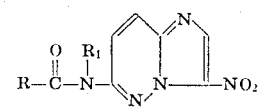

| | | \multicolumn{6}{c}{No. cleared ᵃ/No. treated after a single gavage dose of mg./kg.} |
|---|---|---|---|---|---|---|---|
| R | R₁ | 100 | 50 | 25 | 12.5 | 6.2 | 3.1 | 1.6 |
| CH₃ | H | | 10/10 | 30/30 | 20/20 | 30/30 | 14/20 | 4/10 |
| CH₃ | CH₃ | | | 10/10 | 10/10 | 30/30 | 18/20 | 5/20 |
| C₂H₅ | H | | | 10/10 | 9/10 | 7/10 | | |
| C₃H₇ | H | | | 10/10 | 7/10 | 0/10 | | |

ᵃ Number of mice in which no motile trichomonads were detected microscopically, at autopsy 5 days post treatment.

EXAMPLE 1

Preparation of 6-Acetamido-3-nitroimidazo[1,2-b]pyridazine

A suspension of 6 grams of 6-chloro-3-nitroimidazo-[1,2-b]pyridazine (prepared as described by J. Kobe et al. Tetrahedron, Vol. 24 pp. 239–249 (p. 168) in 250 ml. of hot ethanol is stirred as a stream of ammonia is passed in four a period of 30 minutes. The reaction mixture is then heated on a steam bath for 24 hours before isolation of the product. After recrystallization from water the pure compound, 6-amino-3-nitroimidazo[1,2-b]pyridazine melts at 310°–312°C. with decomposition.

A mixture consisting of 2 grams of 6-amino-3-nitroimidazo[1,2-b]pyridazine, 10 ml. of acetic anhydride, and 25 ml. of pyridine is stirred at gentle reflux temperature for 2 hours. After cooling to room temperature, the reaction mixture is diluted with 100 ml. of cold water. Standing at 4°C. leads to the formation of a precipitate. This is cooled and recrystallized from ethanol to give 1.7 grams of pure compound, melting at 216°–218°C.

Analysis Calcd. for $C_8H_7N_5O_3$: C, 43.44; H, 3.19; N, 31.67.

Found: C, 43.38; H, 3.13; N, 31.70.

EXAMPLE 2

Preparation of 3-Nitro-6-propionamidoimidazo[1,2-b]pyridazine

The subject compound is prepared essentially by the procedure of Example 1, propionic anhydride replacing the acetic anhydride. After recrystallization from methanol, the pure compound melts at 201°–203.5°C.

Analysis Calcd for $C_9H_9N_5O_3$: C, 45.96; H, 3.86; N, 29.78.

Found: C, 46.32; H, 3.86; N, 29.45.

EXAMPLE 3

Preparation of 6-Butyramido-3-nitroimidazo[1,2-b]pyridazine

The above compound is prepared essentially by the procedure of Example 1, butyric anhydride replacing the acetic anhydride. The reflux period is extended to 18 hours. The crude product is purified by recrystallization from methanol, and then melts at 196.5°–199.5°C.

Analysis Calcd. for $C_{10}H_{11}N_5O_3$: C, 48.19; H, 4.45; N, 28.10.

Found: C, 47.77; H, 4.33; N, 28.35.

EXAMPLE 4

Preparation of 6-Lauramido-3-nitroimidazo[1,2-b]pyridazine

A mixture consisting of 5 grams of 6-amino-3-nitroimidazo[1,2-b]pyridazine and 100 ml. of pyridine is stirred as 6.75 grams of lauroyl chloride is added dropwise. The mixture is stirred at room temperature for 72 hours, and then filtered, the precipitate being saved. The filtrate is taken to dryness under reduced pressure. The residue is extracted with four 150 ml. portion s of boiling methanol. Cooling the combined methanol extracts gives a second precipitate. The combined precipitates are recrystallized from 65 ml. of 2-methoxyethanol giving 5.2 grams of the subject compound, melting at 147°–149°C Analysis Calcd. for $C_{18}H_{27}N_5O_3$: C, 59.81; H, 7.53; N, 19.38.

Found: C, 59.39; H, 7.47; N, 19.55.

EXAMPLE 5

Preparation of 6-(N-Methylacetamido)-3-nitromidazo[1,2-b]pyridazine

A suspension of 3.8 grams of 6-methylamino-3-nitroimidazo[1,2-b]pyridazine (prepared by the use of methylamine in the procedure of Example 1, paragraph 1) in 20 ml. of acetic anhydride containing 5 drops of concentrated sulfuric acid is stirred on the steam bath until the reaction is completed, and a clear solution obtained. The solution is poured onto cracked ice and a yellow precipitate is obtained. This is collected, dried, and recrystallized from methanol to give 3.4 grams of pure compound, melting at 163°–165°C.

Analysis Calcd. for $C_9H_9N_5O_3$: C, 45.96; H, 3.86; N, 29.78.

Found: C, 45.84; H, 3.83; N, 29.94.

EXAMPLE 6

Suppositories containing 6-acetamido-3-nitroimidazo[1,2-b]pyridazine

|  | 30 suppositories g. |
|---|---|
| 6-acetamido-3-nitroimidazo[1,2-b]pyridazine | 15 |
| Purified water qsAD | 20 |
| Gelatin granular | 40 |
| Glycerin | 140 |

Add the water to the medicinal substance to make 20 g. and dissolve or mix together. Add the glycerine and mix well. To the mixture add the gelatin carefully avoiding incorporation of air and heat on steam bath until gelatin is dissolved. Pour the melted mixture into 30 chilled molds and allow to congeal. Each suppository contains 500 mg. of therapeutic component.

EXAMPLE 7

Preparation of Hard Shell Capsules containing 3-nitro-6-propionamidoimidazo[1,2-b]pyridazine

|  | per 1000 Capsules g. |
|---|---|
| 3-nitro-6-propionamidoimidazo-[1,2-b]pyridazine | 200.0 |
| Lactose | 900.0 |
| Magnesium stearate | 10.0 |

The ingredients are blended together. The mixture is used to fill hard shell capsules of a suitable size each containing 200 mg. of active component.

EXAMPLE 8

Preparation of Tablet Compositions containing 6-propionamido-3-nitroimidazo[1,2-b]pyridazine

|  | per 1000 Tablets g. |
|---|---|
| 6-propionamido-3-nitro-imidazo[1,2-b]pyridazine | 100.0 |
| Corn starch USP | 300.0 |
| Dibasic calcium phosphate | 2150.0 |
| Magnesium stearate | 60.0 |

The above ingredients are thoroughly mixed and incorporated into a standard pharmaceutical tablet. Each tablet contains 100 mg. of therapeutic component.

We claim:

1. A nitroimidazopyridazine of the formula:

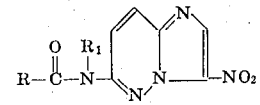

wherein R is alkyl, ($C_1$–$C_{11}$) and $R_1$ is selected from the group consisting of hydrogen and lower alkyl.

2. The nitroimidazopyridazine according to claim 1, 6-acetamido-3-nitroimidazo[1,2-b]pyridazine.

3. The nitroimidazopyridazine according to claim 1, 3-nitro-6-propionamidoimidazo[1,2-b]pyridazine.

4. The nitroimidazopyridazine according to claim 1, 6-butyramido-3-nitroimidazo[1,2-b]pyridazine.

5. The nitroimidazopyridazine according to claim 1, 6-lauramido-3-nitroimidazo[1,2-b]pyridazine.

6. The nitroimidazopyridazine according to claim 1, 6-(N-methylacetamido)-3-nitroimidazo[1,2-b]pyridazine.

* * * * *